Patented May 24, 1938

2,118,088

UNITED STATES PATENT OFFICE 2,118,088

MONOAZO DYESTUFFS AND THEIR PRODUCTION

Arthur Howard Knight and Henry Alfred Piggott, Blackley, Manchester, England, assignors to Imperial Chemical Industries Limited, a corporation of Great Britain No Drawing. Application February 21, 1935, Serial No. 7,659. In Great Britain February 23, 1934

13 Claims. (Cl. 260—96)

The present invention relates to the manufacture of new monoazo dyestuffs.

According to the invention we make the said new dyestuffs by coupling a diazotized para-nitroamine of the benzene or naphthalene series, having no sulphonic or carboxylic acid groups, with the compounds (or mixture of compounds) obtained by N-substituting with polyethenoxy radicals, to the extent defined below, those amines of the benzene series adapted to couple in the para position to the amino group.

The compounds used as second components according to the invention have the general formula:

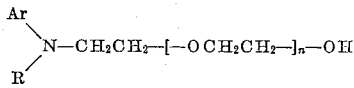

where Ar is an aryl group of the benzene series free from carboxylic and sulphonic acid groups and having an unsubstituted position para to the N, R is methyl, ethyl, β-hydroxethyl or

$n$ and $n'$ being integers greater than zero, such that $n+n'$ does not exceed 10 and preferably does not exceed 4.

In selecting a suitable diazo component to couple with an amine of the formula given, attention must be paid to the necessity of being able to separate the obtained dyestuff in a solid form. When the sum of $n$ and $n'$ is 6 or more, and the diazotized amine used for coupling is 4-nitroaniline, the dyestuff may be a jelly-like mass whereas when the sum of $n$ and $n'$ is 3 or 4 the dyestuffs can be readily isolated in solid form.

Suitable coupling components may be made by reacting in presence of a small quantity of caustic soda, suitable amines such as e. g. N-hydroxyethyl-m-toluidine. N-n-butyl-3-amino-4-methoxytoluene, N-ethylaniline or aniline with a quantity of ethylene oxide calculated to supply the necessary number of polyethenoxy residues (see formula above). Alternatively, a mixture of ethylene chlorhydrin and caustic soda may be used in place of ethylene oxide.

Suitable diazo components are diazotized 4-nitroaniline, 5-nitro-2-anisidine, 2-chlor-4-nitroaniline, 2,6-dichloro-4-nitroaniline, 2,6-dibromo-4-nitroaniline, 2,4-dinitroaniline, 6-chloro-2,4-dinitroaniline, 2,4-dinitro-1-naphthylamine.

Monoazo dyestuffs from N-mono-β-hydroxyethyl-, N-alkyl-β-hydroxyethyl-, and N-β,β'-dihydroxyethylamines are known. The dyestuffs of the present invention, however, probably by virtue of the multiplicity of polyethenoxy groups they contain, have characteristic properties.

The new dyestuffs can be converted into dispersible dyestuff powders by milling the dyestuff pastes with known dispersing agents, e. g. those described in British specification 224,077, followed by drying and grinding operations. These dispersable powders are superior to those obtained by similarly treating the known dyestuffs mentioned above as regards the ease and efficiency with which they disperse in water, the dispersions obtained having the appearance of true solutions. To this property are due the excellent results obtained in using the new dyestuffs in the printing of acetate artificial silk. The prints obtained are level, even in weak shades.

Further, the new dyestuffs have other advantages as compared to the known dyestuffs. The speed of dyeing at low temperatures is higher, the change in speed of dyeing with rise of temperature is more regular, and quick dyeing is less dependent on high temperatures. Hence, penetration and the production of level shades on heavy, closely knitted or woven, acetate artificial silk fabrics, as for example, crepes, is facilitated.

These properties, however, do not prevent the new dyestuffs from being employed satisfactorily in mixtures with other insoluble azo or anthraquinone dyestuffs for the purpose of coloring artificial silk.

The invention is illustrated but not limited by the following examples, in which the parts are by weight.

Example 1

183 parts of 2,4-dinitroaniline are diazotized in concentrated sulphuric acid solution by the aid of nitrosyl sulphuric acid in the known way. The aqueous solution of the diazo compound obtained by pouring the sulphuric acid solution into ice and water and filtering is added slowly to a solution in 4000 parts of water at 0°–5° C. of 283 parts of the product obtained by condensing 151 parts of N-β-hydroxyethyl-m-toluidine with three equivalents (132 parts) of ethylene oxide. Simultaneously keeping the temperature below 5° C. there is added a 40% solution of aqueous caustic soda, at such a rate that the coupling medium is always faintly acid to Congo red paper. When combination is complete the dyestuff suspension is rendered just alkaline with caustic soda and the dyestuff is filtered off, washed with water, and preserved as paste or dried in any suitable way.

The dyestuff is conveniently applied to acetate artificial silk by the method described in British specification No. 224,077.

A reddish-violet dyeing of good fastness properties and dischargeability is obtained.

The coupling component used in the example is made in the following way:—

A mixture of 151 parts of N-β-hydroxyethyl-m-toluidine, 132 parts of ethylene oxide and 0.5 part of 10% aqueous caustic soda is heated at 140° C. in a sealed vessel until the internal pressure falls to zero. A pale yellow liquid, which is soluble in hot water is obtained. The yield is 265 parts; this corresponds to an absorption of about 2.5 molecular equivalents of ethylene oxide.

If in the above example the coupling component is replaced by the product made by condensing 107 parts of m-toluidine with 220 parts of ethylene oxide a dyestuff of similar shade but with somewhat superior properties as regards dispersion in water is obtained.

Example 2

267 parts of 6-bromo-2,4-dinitroaniline are diazotized as in Example 1, and the cooled diazo solution added slowly to a solution in 4000 parts of water at 0° C. and 370 parts of 10% hydrochloric acid of 239 parts of the product obtained by condensing 151 parts of N-β-hydroxyethyl-m-toluidine with two equivalents (88 parts) of ethylene oxide. Ice is added from time to time to keep the temperature of the coupling medium at 0° C. Coupling occurs rapidly and when complete the dyestuff is filtered off, washed thoroughly with water to remove sulphuric acid, and preserved as paste or dried in any suitable way.

It dyes acetate artificial silk in bluish-violet shades of good fastness properties and dischargeability when applied in the manner described in Example 1.

The coupling component used in this example is obtained by reacting the above stated amounts of amine and ethylene oxide under the conditions described in Example 1.

Example 3

A suspension of 172.5 parts of 2-chloro-4-nitroaniline in 8000 parts of water and 1110 parts of 10% hydrochloric acid is diazotized by the addition of 69 parts of sodium nitrite. The solution of the diazo compound is added to a solution obtained by dissolving in 4000 parts of water and 370 parts of 10% hydrochloric acid the product obtained by condensing 121 parts of N-ethylaniline with 88 parts (two equivalents) of ethylene oxide. Coupling is facilitated by the addition of approximately 408 parts of sodium acetate. When coupling is complete the dyestuff suspension is rendered alkaline and the dyestuff filtered off, washed thoroughly with water, and preserved as paste or dried in any suitable way.

The dyestuff dyes acetate artificial silk in bluish-red shades of good fastness to light and is superior to the corresponding dyestuff from N-ethyl-N-β-hydroxyethylaniline in ease of dispersion and in penetration of crepe materials consisting of or containing acetate artificial silk.

If the coupling component in the above example is replaced by the product obtained by condensing 121 parts of N-ethylaniline, with 176 parts of ethylene oxide under the conditions described in Example 1, a bluish-red dyestuff is obtained which disperses more readily in water than that obtained by the use of 88 parts of ethylene oxide.

Example 4

138 parts of p-nitroaniline are diazotized in the usual way and to the aqueous solution of the diazo compound are added 297 parts of the product obtained by condensing 121 parts of N-ethylaniline with 4 equivalents (176 parts) of ethylene oxide. Aqueous sodium acetate is added during half an hour to facilitate coupling by removing the mineral acidity of the coupling medium (approximately 270 parts of sodium acetate are used). When combination is complete the dyestuff suspension is rendered alkaline and the dyestuff filtered off, washed with water, and preserved as paste or dried in any suitable way.

The dyestuff dyes acetate artificial silk in scarlet-red shades of good fastness to light and is much superior to the corresponding dyestuff from N-ethyl-N-β-hydroxyethylaniline in ease of dispersion.

The coupling component used in the example is obtained by reacting the above stated amounts of amine and ethylene oxide under the conditions described in Example 1.

Example 5

138 parts of p-nitroaniline are diazotized in the usual way and to the aqueous solution of the diazo compound are added 313 parts of the product obtained by condensing 93 parts of aniline with 5 equivalents (220 parts) of ethylene oxide. Aqueous sodium acetate is added during half an hour to facilitate coupling by removing mineral acidity (approximately 270 parts of sodium acetate are used). When combination is complete the dyestuff is filtered off, washed with water, and the dyestuff paste preserved as such or dried in any suitable way.

The dyestuff dyes acetate artificial silk in yellowish-red shades of good fastness properties and dischargeability, and is superior to the corresponding dyestuff from N-β,β'-dihydroxydiethylaniline in ease of dispersion.

The coupling component used in this example is obtained by reacting the above stated amounts of amine and ethylene oxide under the conditions described in Example 1.

Example 6

69 parts of sodium nitrite are added to 1480 parts of 100% sulphuric acid and stirred until no solid remains, then 222 parts of 6-chloro-2,4-dinitroaniline are added to this with stirring during 2 hours. After stirring for a further hour the solution is heated to 50° C., kept at that temperature for two hours, and then cooled to 20° C. It is then added slowly to a cold (0° C.) well agitated solution in 4000 parts of water and 370 parts of 10% hydrochloric acid of 327 parts of the product obtained by condensing 151 parts of N-β-hydroxyethyl-m-toluidine with 4 equivalents (176 parts) of ethylene oxide. Ice is added from time to time to keep the temperature of the coupling medium at 0° C. Coupling is rapid and when complete the dyestuff is filtered off, washed thoroughly with acid to remove sulphuric acid, and preserved as paste or dried in any suitable way.

When applied in the manner described in Example 1 it dyes acetate artificial silk in bluish-violet shades of good fastness properties and dischargeability, and penetrates crepe materials of acetate artificial silk better than the corresponding dyestuff from N-β,β'-dihydroxydiethyl-m-toluidine.

If the coupling component in the above example is replaced by the product obtained by condensing 107 parts of m-toluidine with 220 parts of ethylene oxide under the conditions described in Example 1 a bluish-violet dyestuff of similar properties is obtained.

*Example 7*

69 parts of sodium nitrite added to 1480 parts of sulphuric acid monohydrate until no solid remains, then 238 parts of 2,4-dinitro-1-naphthylamine are added to this with stirring during two hours. After stirring for a further hour the solution obtained is heated to 45° C. and kept at that temperature for two hours and then cooled to 20° C. It is then added slowly to a cold (0° C.) well agitated solution in 4000 parts of water and 370 parts of 10% hydrochloric acid of 342 parts of the product obtained by condensing 107 parts of m-toluidine with 235 parts of ethylene oxide, ice being added from time to time to keep the temperature at 0° C. When coupling is complete the dyestuff is filtered off, washed with water, resuspended in 6000 parts of water, the resulting suspension rendered alkaline with sodium carbonate, and the dyestuff filtered off and preserved as paste or dried in any suitable way. When applied in the manner of Example 1 it dyes acetate artificial silk in violet shades.

The coupling component used above is obtained by reacting the above stated amounts of amine and ethylene oxide under the conditions described in Example 1.

We claim:

1. The method of making a dyestuff which comprises diazotizing and coupling a para nitroarylamine from the group consisting of the benzene and naphthalene nitroarylamines to a position para to the amino group of an N-substituted ethylene oxide derivative of aniline in which there are combined between two and ten ethylene oxide groups.

2. The method of making a dyestuff which comprises diazotizing and coupling a para nitroarylamine from the group consisting of the benzene and naphthalene nitroarylamines to a position para to the amino group of an N-substituted ethylene oxide derivative of aniline in which there are combined between four and ten ethylene oxide groups.

3. The method of making a dyestuff which comprises diazotizing and coupling a para nitroarylamine from the group consisting of the benzene or naphthalene nitroarylamines to a position para to the amino group of an N-substituted ethylene oxide derivative of aniline in which there are combined about four ethylene oxide groups.

4. A compound formed by coupling diazotized 6-chloro-2:4-dinitroaniline to the condensation product of meta-toluidine and three equivalents of ethylene oxide.

5. The compound being the product of coupling 6-chloro-2:4-dinitroaniline to the compound formed by condensing N-n-butyl-cresidine with two equivalents of ethylene oxide.

6. A dyestuff being the product which results from coupling a diazotized para-nitroamine from the group consisting of the benzene and naphthalene nitroamines which does not contain a water-solubilizing substituent with a substituted amine having the formula

in which X is one of a group consisting of methyl, ethyl, beta-hydroxyethyl and

CH₂—CH₂—(OCH₂—CH₂)ₙ'—OH, and Y is

CH₂CH₂—(OCH₂—CH₂)ₙ—OH, n and n' are integers and the sum of n and n' is not greater than 10.

7. A dyestuff being the product of coupling a diazotized para-nitroamine from the group consisting of the benzene and naphthalene nitroamines with a compound having the formula

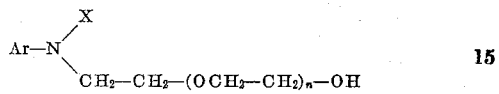

in which Ar is an aryl group of the benzene series free from water-solubilizing groups, X is one of a group consisting of methyl, ethyl, beta-hydroxyethyl and CH₂—CH₂—(OCH₂—CH₂)ₙ'—OH, n and n' are integers and the sum of n and n' is not more than 10.

8. A dyestuff being the product of coupling a diazotized para-nitroamine from the group consisting of the benzene or naphthalene nitroamines with a compound having the formula

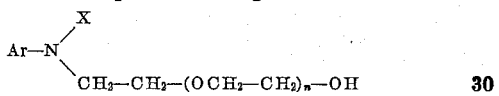

in which Ar is an aryl group of the benzene series free from water-solubilizing groups, X is one of a group consisting of methyl, ethyl, beta-hydroxyethyl and

CH₂—CH₂—(OCH₂—CH₂)ₙ'—OH, n and n' are integers and the sum of n and n' is not more than 4.

9. The method of making monoazo dyestuffs which comprises diazotizing and coupling a p-nitraniline with an aniline having the position para to its amino group unoccupied and wherein said amino group is combined with three to ten equivalents of ethylene oxide.

10. The method of making monoazo dyestuffs which comprises diazotizing and coupling 1-amino-2-chlor-4-nitrobenzene with the product obtained by condensing N-ethylaniline with two to four equivalents of ethylene oxide.

11. The monoazo dyestuffs having the general formula

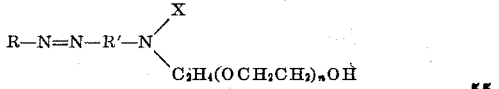

wherein R is the radical of a p-nitraniline, X represents C₂H₄(OCH₂CH₂)ₙ'OH, n' being zero or a whole number, and n is a whole number, the sum of n and n' being no more than ten.

12. The monoazo dyestuffs having the general formula

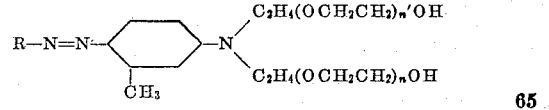

wherein R is a radical of a diazotized p-nitraniline, n' is zero or 1 and n has the value 2—n'.

13. The azo dyestuff having the formula

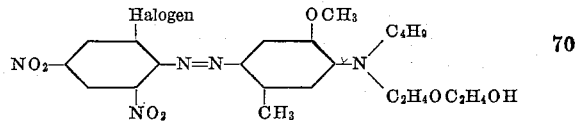

ARTHUR HOWARD KNIGHT.
HENRY ALFRED PIGGOTT.